(12) United States Patent  (10) Patent No.: US 9,325,970 B2
Sakayori  (45) Date of Patent: Apr. 26, 2016

(54) IMAGING CONTROL DEVICE AND IMAGING CONTROL METHOD

(75) Inventor: Takahiro Sakayori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 438 days.

(21) Appl. No.: 13/469,226

(22) Filed: May 11, 2012

(65) Prior Publication Data

US 2012/0319968 A1 Dec. 20, 2012

(30) Foreign Application Priority Data

Jun. 17, 2011 (JP) .................................. 2011-135358

(51) Int. Cl.
G09G 5/00 (2006.01)
H04N 13/02 (2006.01)

(52) U.S. Cl.
CPC .................................. H04N 13/025 (2013.01)

(58) Field of Classification Search
USPC ............................. 345/660; 359/819; 382/118
See application file for complete search history.

(56) References Cited

U.S. PATENT DOCUMENTS

| 5,396,287 | A | 3/1995 | Cho | |
|---|---|---|---|---|
| 8,164,655 | B2 * | 4/2012 | Lablans | 348/231.3 |
| 8,203,640 | B2 * | 6/2012 | Kim et al. | 348/333.12 |
| 8,294,748 | B2 * | 10/2012 | Stec et al. | 348/36 |
| 8,532,346 | B2 * | 9/2013 | Thorn | 382/118 |
| 2003/0184885 | A1 * | 10/2003 | Tansho et al. | 359/819 |
| 2006/0187311 | A1 * | 8/2006 | Labaziewicz et al. | 348/218.1 |
| 2009/0046075 | A1 * | 2/2009 | Kim et al. | 345/173 |
| 2011/0085016 | A1 | 4/2011 | Kristiansen et al. | |
| 2011/0221866 | A1 * | 9/2011 | Ohta | 348/46 |

FOREIGN PATENT DOCUMENTS

| EP | 0 326 751 A2 | 8/1989 |
|---|---|---|
| EP | 2 355 526 A2 | 8/2011 |
| JP | 7-234447 A | 9/1995 |
| JP | 2006-308767 | 11/2006 |
| JP | 2007-81508 | 3/2007 |
| JP | 2007-159047 A | 6/2007 |
| JP | 2009-94724 A | 4/2009 |
| JP | 2009-244369 A | 10/2009 |
| JP | 2009-284452 A | 12/2009 |
| JP | 2010-28364 A | 2/2010 |
| JP | 2010-271774 | 12/2010 |
| JP | 2011-60209 A | 3/2011 |
| JP | 2011-103631 A | 5/2011 |

OTHER PUBLICATIONS

Extended European Search Report issued Oct. 1, 2012 in European Patent Application No. 12170786.3.

(Continued)

Primary Examiner — Calvin C Ma

(74) Attorney, Agent, or Firm — Oblon, McClelland, Maier & Neustadt, L.L.P.

(57) ABSTRACT

An apparatus includes an operation signal reception unit and a control unit. The operation signal reception unit receives an operation signal which corresponds to a vertical operation in a vertical direction of a screen with respect to a panel which is able to detect a touch or an approach with respect to a plurality of positions on the screen. The control unit is configured to independently control processing related to each of a plurality of imaging units according to the vertical operation.

20 Claims, 10 Drawing Sheets

(56) References Cited

OTHER PUBLICATIONS

Office Action issued Feb. 26, 2015 in Japanese Patent Application No. 2011-135358.

Office Action issued Sep. 29, 2015 in Japanese Patent Application No. 2011-135358.

* cited by examiner

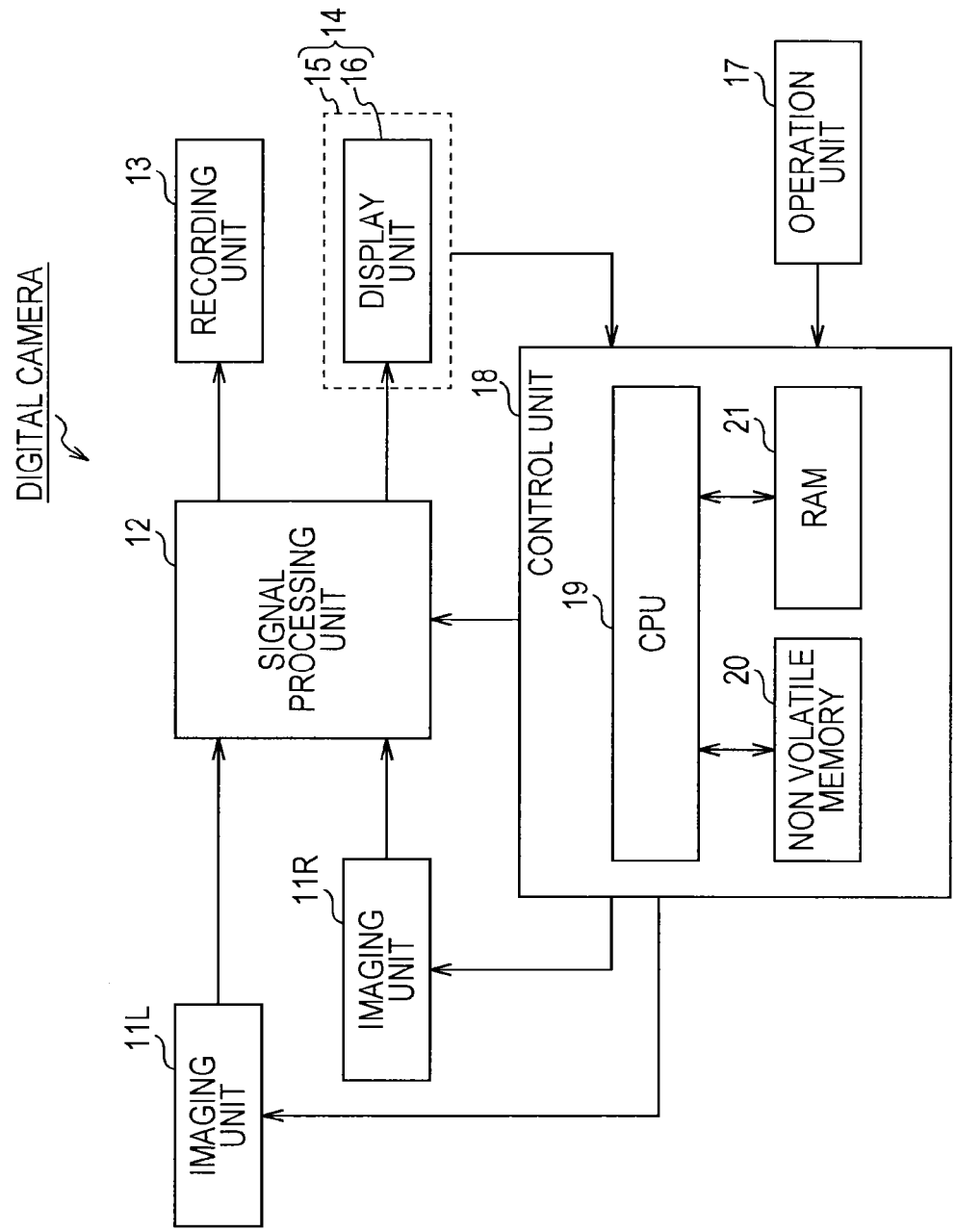

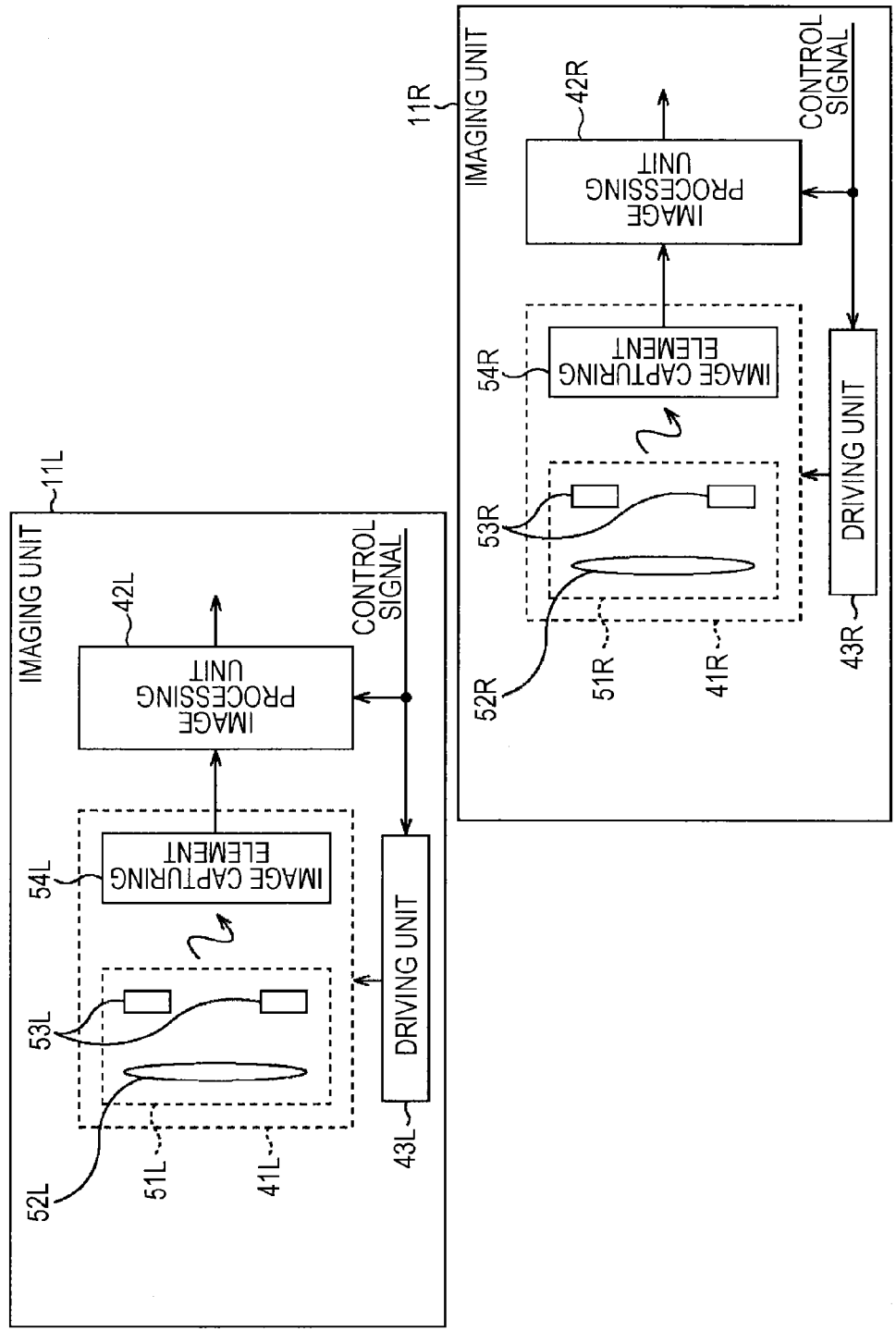

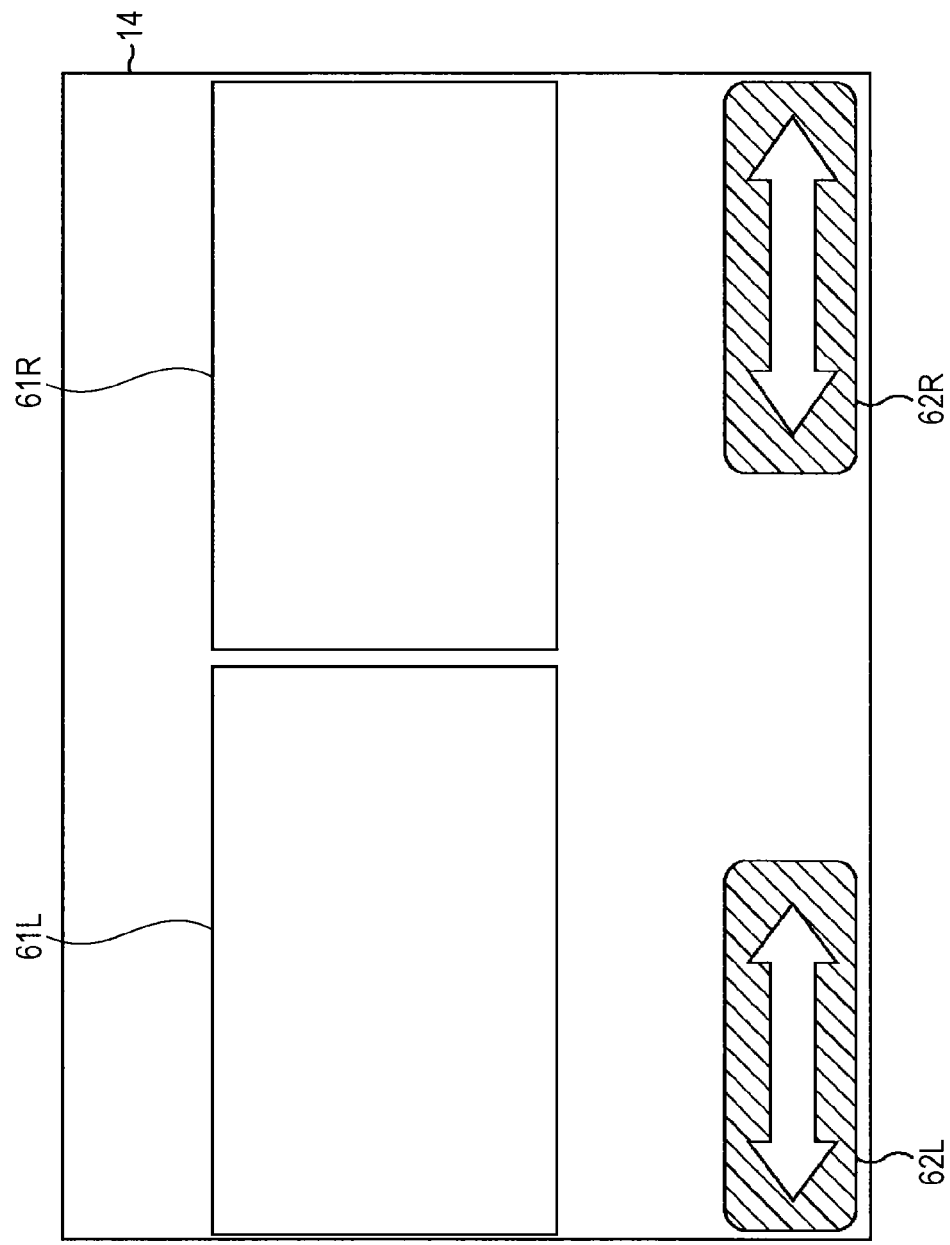

FIG. 5

| RIGHT IMAGING SYSTEM / LEFT IMAGING SYSTEM | ONE MAGNIFICATION/ FRONT DIRECTION | TWO MAGNIFICATIONS/ FRONT DIRECTION | ONE MAGNIFICATION/ RIGHT DIRECTION | TWO MAGNIFICATIONS/ RIGHT DIRECTION |
|---|---|---|---|---|
| ONE MAGNIFICATION/ FRONT DIRECTION | A | B | C | D |
| TWO MAGNIFICATIONS/ FRONT DIRECTION | E | F | G | H |
| ONE MAGNIFICATION/ LEFT DIRECTION | I | J | K | L |
| TWO MAGNIFICATIONS/ LEFT DIRECTION | M | N | O | P |

IMAGING CONTROL DEVICE AND IMAGING CONTROL METHOD

CROSS-REFERENCE TO RELATED APPLICATIONS

The present application is based upon and claims the benefit of priority under 35 U.S.C. §119 of Japanese Priority Patent Application JP 2011-135358 filed in the Japanese Patent Office on Jun. 17, 2011, the entire contents of which are hereby incorporated by reference.

BACKGROUND

The present technology relates to an imaging control device and an imaging control method, particularly, for example, relates to an imaging control device and an imaging control method which are able to improve an operability of an imaging device having a plurality of imaging units as an imaging unit which captures images.

For example, it is possible to capture a stereoscopic image (3D (Dimension) image) using a digital camera (twin lens camera) with twin lens imaging system.

In addition, a twin lens camera has been proposed, which captures images rapidly by preferentially using an imaging system of which the time necessary for an initial operation is short (for example, refer to Japanese Unexamined Patent Application Publication No. 2006-093859).

SUMMARY

Meanwhile, a proposal of an UI (User Interface) which improves the operability of the imaging device has been requested, in imaging devices such as a digital camera having two or more imaging systems like a twin lens camera, or the like.

It is desirable to provide an imaging device which can improve operability.

According to the present technology, it is possible to improve the operability of the imaging control device.

Accordingly, the present invention broadly comprises an apparatus, a method, and a non-transitory computer readable medium encoded with a program which causes the processor to perform the method. In one embodiment, the apparatus includes an operation signal reception unit and a control unit. The operation signal reception unit receives an operation signal which corresponds to a vertical operation in a vertical direction of a screen with respect to a panel which is able to detect a touch or an approach with respect to a plurality of positions on the screen. The control unit is configured to independently control processing related to each of a plurality of imaging units according to the vertical operation.

In another embodiment, the operation signal reception unit receives an operation signal which corresponds to a horizontal operation in a horizontal direction of a screen with respect to a panel which is able to detect a touch or an approach with respect to the screen. The control unit is configured to independently control an imaging direction of each of a plurality of imaging units according to the horizontal operation.

BRIEF DESCRIPTION OF THE DRAWINGS

FIG. 1 is a block diagram which shows a configuration example of an embodiment of a digital camera to which the present technology is applied.

FIG. 2 is a block diagram which shows a configuration example of imaging units.

FIG. 4 is a diagram which shows a display example of an input/output panel.

FIG. 5 is a diagram which shows a display example of an input/output panel.

DETAILED DESCRIPTION OF EMBODIMENTS

Figure 3A:
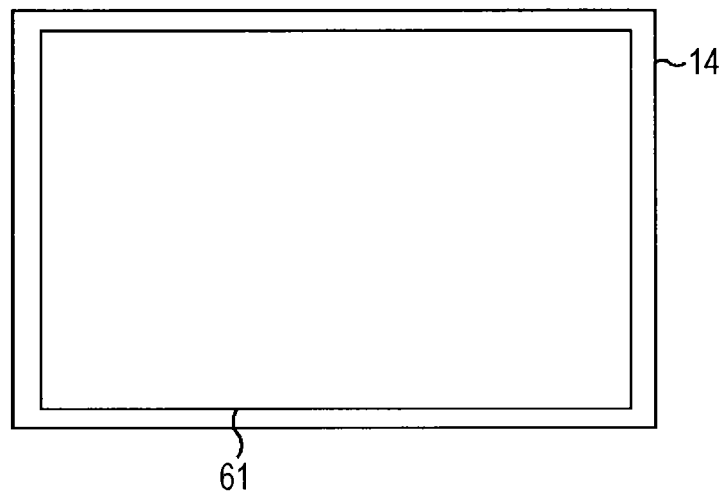
FIGS. 3A and 3B are diagrams which show display examples of an input/output panel.

An Embodiment of Digital Camera to which Present Technology is Applied

FIG. 1 is a block diagram which shows a configuration example of an embodiment of an imaging device as a digital camera to which the present technology is applied.

In FIG. 1, a digital camera includes a plurality of, for example, two imaging units 11R and 11L, a signal processing unit 12, a recording unit 13, an input/output panel 14, an operation unit 17, and a control unit 18.

As described above, the digital camera is a twin lens camera, since the camera has two imaging units of 11R and 11L.

The imaging units 11R and 11L respectively capture images corresponding to light input thereto according to a control from the control unit 18, and supplies images (signals) which are obtained as a result thereof to the signal processing unit 12.

The signal processing unit 12 performs signal processing to an image from the imaging units 11R and 11L, according to the control from the control unit 18, and supplies to the recording unit 13 and the input/output panel 14, as necessary.

The recording unit 13 is configured, for example, such that a removable recording medium (not shown) such as a memory card, an optical disc, a magnetic disk (HD (Hard Disk)) or the like is detachably mounted, and images which are supplied from the signal processing unit 12 is recorded in the recording medium.

In addition, the recording unit 13 reproduces the image recorded in the recording medium, and displays the image by supplying the image to the input/output panel 14 through the signal processing unit 12.

Further, in the recording unit 13, a reproduction function for reproducing the image recorded in the recording medium is not important.

The input/output panel 14 has a detection unit 15 and a display unit 16.

The detection unit 15 is configured by a device which has a function of receiving (detecting) an input from outside, that is, for example, a touch panel of an electrostatic-type or the like, or a set of a light source for illuminating light and a sensor for receiving reflected light of the light from an object, or the like.

When an object from the outside, that is, for example, a finger of a user, a touch pen which is used by the user, or the like approaches, or touches, the detection unit 15 detects the approach, or the position of the touch, and supplies the detection signal which denotes the position to the control unit 18.

The display unit 16 is a device for displaying images, that is, for example, for displays images which are formed in a liquid crystal panel, or the like, and are supplied from the signal processing unit 12.

The input/output panel 14 is configured by being integrally formed of the above described detection unit 15 and the display unit 16. The input/output panel is able to display images in the display unit 16, and to detect an operation input (a touch or an approach) from the outside with respect to the images which are displayed on the display unit 16 by the detection unit 15.

In addition, according to the embodiment, the detection unit 15 is formed to be able to detect a touch, or an approach with respect to one or more positions (one position, and a plurality of positions) on the screen (the screen of the display unit 16) of the input/output panel 14. Accordingly, for example, since it is possible to detect the touch (and the approach) by a plurality of fingers of two or more in the input/output panel 14, a user is able to perform multiple touch operations with respect to the input/output panel 14.

The operation unit 17 is a physical button or the like which is operated by the user, and supplies an operation signal corresponding to the user's operation to the control unit 18.

The control unit 18 has a CPU 19, a non-volatile memory 20, and a RAM 21, and controls imaging units 11L and 11R, and the signal processing unit 12 according to the detection signal from the input/output panel 14 (detection unit 15 thereof), or the operation signal or the like from the operation unit 17.

The CPU 19 controls each block which configures the digital camera, by executing a program which is stored in the non-volatile memory 20.

The non-volatile memory 20 stores data (including program) which is necessary to be maintained even when the power of the digital camera is off, such as the program executed by the CPU 19, or data which is necessary to be stored in the operation of the CPU 19, an imaging parameter which is set when the user operates the operation unit 17, or the like.

The RAM 21 temporarily stores data which is necessary for the operation of the CPU 19.

Here, for example, the imaging unit 11L is provided on the left side of the imaging unit 11R, when seen from the user who operates the digital camera positioned at a side which is opposite to an object when facing the digital camera to the object. Therefore, the imaging unit 11R is provided on the right side of the imaging unit 11L.

In addition, the input/output panel 14 is, for example, installed on a side which is opposite to a side where the imaging units 11L and 11R of the digital camera are provided. Accordingly, when the user faces the digital camera (the imaging units 11L and 11R of the camera thereof) toward an object, the input/output panel 14 is positioned in front of the user.

In the digital camera which is configured as described above, in the control unit 18, the CPU 19 controls each unit of the digital camera by executing the program which is stored in the non-volatile memory 20 or the like.

The imaging units 11L and 11R capture images corresponding to light which is incident thereto according to the control from the control unit 18, and supplies an image signal which is obtained as a result thereof to the signal processing unit 12.

In the signal processing unit 12, (digital) signal processing is performed for the image signal from the imaging units 11L and 11R, and the image signal is supplied to the input/output panel 14 (the display unit 16 thereof). An image corresponding to the image signal from the signal processing unit 12, that is, a so-called through image is displayed in the input/output panel 14.

In addition, the control unit 18 executes predetermined processing according to a signal from the input/output panel 14 (detection unit 15 thereof), or from the operation unit 17.

That is, when the input/output panel 14 or the operation unit 17 is operated, for example, so as to perform image capturing, the control unit 18 causes an image signal from the imaging units 11L and 11R to be compressed and encoded, and record the compressed and encoded image signal on a recording medium which is installed in the recording unit 13 by controlling the signal processing unit 12.

Additionally, the control unit 18 displays an icon as a UI on the input/output panel 14 (display unit 16 thereof), by controlling the signal processing unit 12.

In addition, the control unit 18 reproduces the image from the recording medium in the recording unit 13, and displays on the input/output panel 14 by controlling the signal processing unit 12.

In addition, the digital camera has, for example, an AF (Auto Focus) function, an AE (Auto Exposure) function, an AWB (Auto White Balance) function, or the like, and these functions are executed when the CPU 19 executes the program in the control unit 18.

In addition, the program which is executed by the CPU 19 can be installed, for example, by installing from a removable recording medium to the digital camera, or may be installed to the digital camera by being downloaded through a network.

Configuration Example of Imaging Units 11L and 11R

FIG. 2 is a block diagram which shows a configuration example of the imaging units 11L and 11R of FIG. 1.

The imaging unit 11L has an imaging system 41L, an image processing unit 42L, and a driving unit 43L.

The imaging system 41L includes an optical system 51L and an imaging element 54L.

The optical system 51L includes a lens group 52L, and a diaphragm 53L, adjusts light which is incident thereto, and input the light to the imaging element 54L.

That is, the lens group 52L is formed of a focus lens which moves in the optical axis direction and adjusts focus, a zoom lens which adjusts zoom, and the like, and causes the light from the object to form images on the imaging element 54L through the diaphragm 53L.

In addition, the lens group 52L is able to include a lens which functions as a vibration-proof lens or the like which moves to the direction orthogonal (perpendicular direction) to the optical axis, and corrects a so-called camera shake. In this case, the optical system 51L which includes the lens group 52L has a camera shake correction function which corrects the camera shake.

The diaphragm 53L adjusts the intensity of light which is incident to the imaging element 54L from the lens group 52L, by adjusting the size of an aperture.

The imaging element 54L is formed of, for example, a CCD (Charge Coupled Device), a CMOS (Complementary Metal Oxide Semiconductor), or the like, captures images of an object, and outputs an image signal which is obtained from a result thereof.

That is, the imaging element 54L receives light which is incident from the optical system 51L, and outputs the light by performing photoelectrical conversion with respect to the light, and converts the light to an image signal as an electrical signal corresponding to the amount of light received. The image signal which is output from the imaging element 54L is supplied to the image processing unit 42L.

The image processing unit 42L performs amplification, an A/D (Analog/Digital) conversion, and gain adjustment of the image signal from the imaging element 54L. In addition, the image processing unit 42L performs image processing such as white balancing processing which adjust a white balance of the image signal from the imaging element 54L, as necessary, and supplies the signal to the signal processing unit 12 (FIG. 1).

In addition, in the image processing unit 42L, for example, in the imaging element 54L, camera shake correction processing for obtaining an image in which the camera shake is corrected can be performed, as one image processing, by synthesizing a plurality of images which is captured at a fast shutter speed (short exposure times) in a short time, other than that.

In addition, a control signal is supplied from the control unit 18, in the image processing unit 42L. The image processing unit 42L performs the image processing according to the control signal from the control unit 18.

That is, the image processing unit 42L performs on and off switching of the image processing, for example, camera shake correction processing, or the like, according to the control signal from the control unit 18.

The control signal is supplied to the driving unit 43L from the control unit 18.

The driving unit 43L drives the imaging system 41L according to the control signal from the control unit 18.

That is, the driving unit 43L drives the optical system 51L which is included in the imaging system 41L according to the control signal from the control unit 18.

Specifically, the driving unit 43L adjusts the magnification of the focus and zoom, for example, by driving a focus lens or a zoom lens of the lens group 52L included in the optical system 51L.

In addition, for example, the driving unit 43L drives the diaphragm 53L included in the optical system 51L, and adjusts the diaphragm (aperture of the diaphragm 53L).

Further, the driving unit 43L performs the on and off switching of the camera shake correction function included in the optical system 51L, for example, by turning on or off the driving of the vibration-proof lens of the lens group 52L included in the optical system 51L.

In addition, the driving unit 43L adjusts the shutter speed of the imaging element 54L.

Further, the driving unit 43 adjusts the direction of the optical axis (direction of the optical axis of the optical system 51L which is orthogonal to a light receiving surface of the imaging element 54L) of the imaging system 41L, that is, the imaging direction of the imaging system 41L, by driving the entire imaging system 41L, for example, to be panned or tilted.

The imaging unit 11R has the same configuration as that of the imaging unit 11L.

That is, the imaging unit 11R has an imaging system 41R, an image processing unit 42R, and a driving unit 43R.

The imaging system 41R has an optical system 51R and an imaging element 54R, and the optical system 51R has a lens group 52R and a diaphragm 53R.

The imaging system 41R, the image processing unit 42R, the driving unit 43R, the optical system 51R, the lens group 52R, the diaphragm 53R, and the imaging element 54R respectively have the same configuration as that of the imaging system 41L, the image processing unit 42L, the driving unit 43L, the optical system 51L, the lens group 52L, the diaphragm 53L, and the imaging element 54L.

The imaging unit 11L and 11R are controlled by the control unit 18 (operates according to the control signal from the control unit 18), as described above, however, the control unit 18 is able to control the respective imaging unit 11L and 11R, independently (separately).

Accordingly, the control unit 18 is able to independently control the optical system 51L included in the imaging unit 11L, and the optical system 51R included in the imaging unit 11R.

For example, the control unit 18 is able to independently control the lens group 52L included in the optical system 51L, and the lens group 52R included in the optical system 51R. In addition, the control unit is able to independently control the zoom magnification of the optical system 51L (imaging unit 11L), and the zoom magnification of the optical system 51R (imaging unit 11R), or is able to independently control the focus of the optical system 51L and the focus of the optical system 51R.

Further, the control unit 18 is able to independently control the diaphragm 53L included in the optical system 51L, and the diaphragm 53R included in the optical system 51R.

In addition, the control unit 18 is able to independently control the on and off switching of the camera shake correction function of the optical system 51L, and the on and off switching of the camera shake correction function of the optical system 51R.

In addition, the control unit 18 is able to independently control the image processing such as the camera shake correction processing by the image processing unit 42L, and the image processing such as the camera shake correction processing by the image processing unit 42R.

Further, the control unit 18 is able to independently control the imaging direction of the imaging system 41L (imaging unit 11L), and the imaging direction of the imaging system 41R (imaging unit 11R).

Display Example of Input/Output Panel 14

Figure 3B:
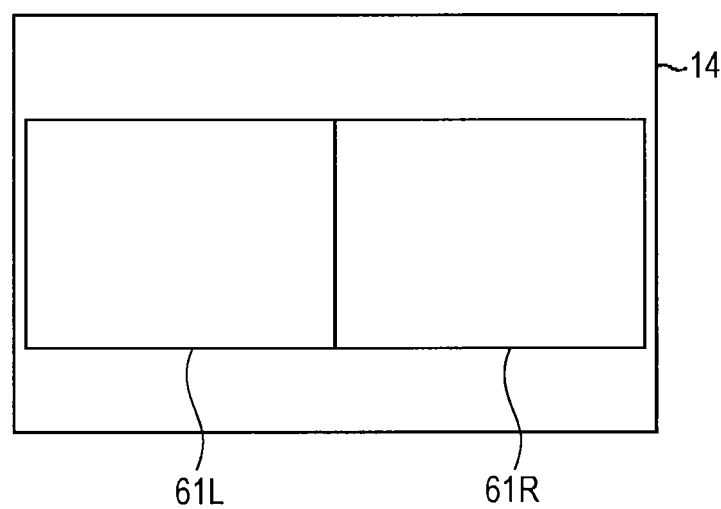

FIGS. 3A and 3B are diagrams which show display examples of a through image of the input/output panel 14 in FIG. 1.

As described in FIG. 2, the control unit 18 is able to independently control the imaging units 11L and 11R. As a result, in the imaging units 11L and 11R, the zoom magnification, or the imaging direction may be different from each other, in some cases.

Therefore, in the input/output panel 14, a through image is displayed by a different display pattern, in a case where the zoom magnification of the imaging units 11L and 11R matches each other, and the imaging directions match each other, and in a case where at least one of the zoom magnification and the imaging direction is different.

FIG. 3A is a diagram which shows a display pattern of the through image in the input/output panel 14 in a case where the zoom magnification matches each other, and the imaging directions match each other, in the imaging units 11L and 11R.

In the input/output panel 14, (one) through image is displayed in one image display area 61.

That is, in the input/output panel 14, for example, a stereoscopic image which can be observed with naked eyes is displayed on the image display area 61 as a through image, by performing signal processing to one image of the images which are captured using the imaging units 11L and 11R, or the image which is captured using the imaging unit 11L and the image which is captured using the imaging unit 11R, in the signal processing unit 12.

Here, a display pattern in which the through image is displayed in one image display area 61 is also referred to as one image display.

FIG. 3B is a diagram which shows a display pattern of the through image in the input/output panel 14 in a case where at least one of the zoom magnification and the imaging direction is different in the imaging units 11L and 11R.

The respective through images of two image display areas 61L and 61R is displayed in the input/output panel 14.

That is, in the input/output panel 14, the image display area 61L is provided on the left side of the screen, and the image display area 61R is provided on the right side of the screen. In addition, an image which is captured in the imaging unit 11L (hereinafter, referred to as L image) is displayed on the image display area 61L as the through image, and an image which is captured in the imaging unit 11R (hereinafter, referred to as R image) is displayed on the image display area 61R as the through image.

Here, the display pattern in which the through image is displayed in two image display areas 61L and 61R is also referred to as two screen display.

In addition, in FIGS. 3A and 3B, when the zoom magnification matches each other, and the imaging directions match each other in the imaging units 11L and 11R, the through image is displayed as one screen display in the input/output panel 14, however, even in a case where the zoom magnification matches each other, and the imaging directions match each other in the imaging units 11L and 11R, the through image can be displayed as two display screen, similarly to the case where at least one of the zoom magnification and the imaging direction is different from each other. In this case, the switching between the one screen display and two screens display can be performed, for example, according to the user's operation.

FIG. 4 is a diagram which shows a display example of the input/output panel 14 in FIG. 1.

Here, in the operation mode of the digital camera in FIG. 1, there are twin lens mode which captures images in two imaging units 11L and 11R, and a single lens mode which captures images in only one of the two imaging units 11L and 11R.

FIG. 4 shows a display example of the input/output panel 14 when the operation mode is the twin lens mode.

In addition, the operation mode can be switched using the operation of the input/output panel 14, or the operation unit 17, for example, such as a touch with respect to the input/output panel 14 for a predetermined time or more.

In the twin lens mode, as shown in FIG. 4, operation area icons 62L and 62R which display the operation area as a target area to be operated by the user are displayed as a UI in the input/output panel 14.

The user is able to respectively operate, for example, the operation area icon 62L using the left thumb, and the operation area icon 62R using the right thumb.

The user is able to perform the vertical operation as an operation in the direction vertical to the screen of the input/output panel 14, for the operation area icons 62L and 62R.

The control unit 18 is able to perform the control of the imaging units 11L and 11R, or the control of the signal processing unit 12, as described above, according to the vertical operation with respect to the input/output panel 14.

That is, for example, the control unit 18 is able to independently control the respective zoom magnification of the imaging units 11L and 11R, according to a pressure of the touch with respect to the operation area icons 62L and 62R of the input/output panel 14 which is generated due to the vertical operation with respect to the input/output panel 14.

Specifically, for example, the control unit 18 controls the zoom magnification of the imaging unit 11L such that the larger the pressure of the touch with respect to the operation area icon 62L is, the more it is zoomed in. Similarly, in the control unit 18, the zoom magnification of the imaging unit 11R is controlled such that the larger the pressure of the touch with respect to the operation area icon 62R is, the more it is zoomed in.

In addition, the control unit 18 controls the zoom magnification of the imaging unit 11L such that it is zoomed out according to the pressure of the touch with respect to the operation area icon 62L, in which the pressure of the touch is generated due to a vertical operation, when the vertical operation is performed after tapping the operation area icon 62L.

Similarly, the control unit 18 controls the zoom magnification of the imaging unit 11R to be zoomed out according to the pressure of the touch with respect to the operation area icon 62R, when the operation area 62R is tapped and vertically operated.

As described above, since the control unit 18 independently control the imaging units 11L and 11R, the user can perform an operation of zooming in of the imaging unit 11L and zooming out of the imaging unit 11R, with respect to the operation area icons 62L and 62R.

In addition, when the input/output panel 14 (detection unit 15 thereof) is able to detect an approach to the input/output panel 14, in addition to the touch, the control unit 18 is able to control the imaging units 11L and 11R according to the distance of, for example, fingers of the user or the like, from the input/output panel 14, which performs the vertical operation with respect the input/output panel 14.

In addition, in the digital camera in FIG. 1, when a zoom key as a physical key which adjusts the zoom magnification is provided in the operation unit 17, the control unit 18 is able to control the zoom magnification of the imaging unit 11L according to the operation of the zoom key, for example, when the zoom key is operated while touching the operation area icon 62L, and is able to control the zoom magnification of the imaging unit 11R according to the operation of the zoom key, for example, when the zoom key is operated while touching the operation area icon 62R.

In the operation area icons 62L and 62R, as described above, the user is able to perform a parallel operation (hereinafter, referred to as a horizontal operation, as well) which is an operation in the direction parallel to the screen of the input/output panel 14, that is, an operation of tracing the screen of the input/output panel 14, in addition to the vertical operation.

The control unit 18 is able to perform the control of the imaging units 11L and 11R, or the signal processing unit 12, as described above, according to the horizontal operation with respect to the input/output panel 14.

That is, for example, the control unit 18 independently controls the respective imaging directions of the imaging units 11L and 11R according to the horizontal operation with respect to the input/output panel 14.

Specifically, for example, the control unit 18 controls (driving control) the imaging system 41L (FIG. 2) such that the imaging direction of the imaging unit 11L is inclined by an angle corresponding to the operation amount of the horizontal operation in the direction where the horizontal operation is performed from the current imaging direction, when the horizontal operation with respect to the operation area icon 62L is performed.

For example, when it is assumed that the imaging direction of the imaging unit 11L is directed to a direction (hereinafter, referred to as the front direction) facing a face opposite to the screen of the input/output panel 14, which is orthogonal to the screen of the input/output panel 14, and when it is assumed that the operation area icon 62L is performed with the horizontal operation of tracing the operation area icon from the right to the left, the imaging direction of the imaging unit 11L is changed to a direction where the imaging unit is panned to the left from the front direction.

Similarly, the control unit 18 controls the imaging system 41R (FIG. 2) such that the imaging direction of the imaging unit 11R is inclined by an angle corresponding to the operation amount of the horizontal operation from the current imaging direction to the direction where the horizontal operation is performed, when the horizontal operation with respect to the operation area icon 62R is performed.

FIG. 5 is a diagram which shows a display example of the input/output panel 14 in the twin lens mode.

In FIG. 1, the signal processing unit 12 displays the through image on the input/output panel 14 according to the control of the control unit 18.

As described in FIGS. 3A and 3B, in the imaging units 11L and 11R, when at least one of the zoom magnification and the imaging direction is different, an image (image L) which is captured in the imaging unit 11L is displayed as a through image on the image display area 61L, and the two screens display in which an image (image R) which is captured in the imaging unit 11L is displayed as a through image is performed on the image display area 61R.

In FIGS. 3A and 3B, the sizes of the image display area 61L and 61R are the same, however, in the two screen display, the sizes of the image display area 61L and 61R are respectively set according to the zoom magnification of the imaging units 11L and 11R, accordingly, it is possible to display the through images in the image display area 61L and 61R with such sizes.

In this case, the image which is captured in the imaging unit 11L (image L) as the through image displayed in the image display area 61L is displayed with a size corresponding to the zoom magnification of the imaging unit 11L.

Similarly, the image which is captured in the imaging unit 11R (image R) as the through image displayed in the image display area 61R is displayed with a size corresponding to the zoom magnification of the imaging unit 11R.

FIG. 5 shows a display example of through images for each zoom magnification and for each imaging direction of the imaging units 11L and 11R.

In addition, in FIG. 5, in order to simplify the description, it is set such that the zoom magnification to be obtained by the imaging units 11L and 11R are two of 1× magnification, or 2× magnification, and the imaging direction to be obtained by the imaging units 11L and 11R are two of the front direction, or the outward direction which is inclined to outside by a predetermined angle with respect to the front direction.

Here, the outward direction of the imaging unit 11L is the leftward direction which is on the left of the front direction, and the outward direction of the imaging unit 11R is the rightward direction which is on the right of the front direction.

When the zoom magnification of the imaging unit 11L (on the left) is 1×, and the imaging direction thereof is the front direction, and the zoom magnification of the imaging unit 11R (on the right) is 1×, and the imaging direction thereof is the front direction, one screen display of the through image is performed in one image display area 61, since the zoom magnification of the imaging unit 11L and zoom magnification of the imaging unit 11R match each other, and the imaging directions thereof match each other.

Here, as described above, the state of the zoom magnification and the imaging direction of the imaging units 11L and 11R (imaging systems 41L and 41R thereof) is also referred to as a state A, as shown in FIG. 5.

When the zoom magnification of the imaging unit 11L is 1×, and the imaging direction thereof is the front direction, and the zoom magnification of the imaging unit 11R is 2×, and the imaging direction thereof is the front direction, two screens display for displaying the through image in the two image display areas 61L and 61R is performed, since the zoom magnification of the imaging unit 11L and zoom magnification of the imaging unit 11R do not match each other.

In addition, in the two screens display, the sizes of the image display areas 61L and 61R are respectively set according to the zoom magnification of the imaging units 11L and 11R.

That is, for example, the ratio of the size of the image display area 61L in which the image L which is captured in the imaging unit 11L is displayed, and the size of the image display area 61R in which the image L captured in the imaging unit 11R is displayed is set so as to correspond to the ratio of the zoom magnification of the imaging unit 11L and the zoom magnification of the imaging unit 11R.

In this case, since the zoom magnification of the imaging unit 11L is 1×, and the zoom magnification of the imaging unit 11R is 2×, the image display area 61L is set to the smaller size than the image display area 61R, and the image display area 61R is set to the larger size than the image display area 61L.

In addition, an image L with low zoom magnification of 1× is displayed as the through image in the small image display area 61L, and an image R with high zoom magnification of 2× is displayed as the through image in the large image display area 61R.

Here, such a state of the zoom magnification and the imaging direction of the imaging units 11L and 11R is also referred to as a state B, as shown in FIG. 5.

In addition, as described above, when the imaging directions of the imaging units 11L and 11R are the same, the zoom magnification of the imaging unit 11L is 1×, and the zoom magnification of the imaging unit 11R is 2×, the user is able to capture a scenery which is in the imaging direction of the imaging units 11L and 11R in a wide range using the imaging unit 11L (with wide angle) of which the zoom magnification is 1×, and to capture an enlarged image which is a part of the scenery using the imaging unit 11R (telephoto) of which the zoom magnification is 2×.

That is, for example, in an event such as a sports day of children, or the like, it is possible to capture the entire image of the competition where a child is participating using the imaging unit 11L with low zoom magnification (of the wide angle), and to capture an image in which the child is zoomed up using the imaging unit 11R with high zoom magnification (telephoto).

When the zoom magnification of the imaging unit 11L is 1×, and the imaging direction thereof is the front direction, and the zoom magnification of the imaging unit 11R is 1×, and the imaging direction thereof is the right direction, two screens display for displaying the through image in the two image display areas 61L and 61R is performed, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since both the zoom magnifications of the imaging units 11L and 11R are 1×, the image display areas 61L and 61R are set to the same size, respectively.

In addition, in the image display areas 61L and 61R with the same size, the images L and R with the same zoom magnification of 1× are respectively displayed as the through images.

Here, such a state of the zoom magnification and the imaging direction of the imaging units 11L and 11R is also referred to as a state C, as shown in FIG. 5.

When the zoom magnification of the imaging unit 11L is 1×, and the imaging direction thereof is the front direction, and the zoom magnification of the imaging unit 11R is 2×, and the imaging direction thereof is the right direction, the two screens display for displaying the through image is performed in the two image display areas 61L and 61R, since the zoom magnifications of the imaging units 11L and 11R do not match each other, and the imaging directions thereof do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the zoom magnification of the imaging unit 11L is 1×, and the zoom magnification of the imaging unit 11R is 2×, the image display area 61L is set to the smaller size than the image display area 61R, and the image display area 61R is set to the larger size than the image display area 61L.

In addition, an image L with low zoom magnification of 1× is displayed as the through image in the small image display area 61L, and an image R with high zoom magnification of 2× is displayed as the through image in the large image display area 61R.

Here, such a state of the zoom magnification and the imaging direction of the imaging units 11L and 11R is also referred to as a state D, as shown in FIG. 5.

When the zoom magnification of the imaging unit 11L is 2×, and the imaging direction thereof is the front direction, and the zoom magnification of the imaging unit 11R is 1×, and the imaging direction thereof is the front direction, the two screens display for displaying the through image is performed in the two image display areas 61L and 61R, since the zoom magnification of the imaging unit 11L and the zoom magnification of the imaging unit 11R do not match each other.

In addition, in the two screens display, the sizes of the image display areas 61L and 61R are respectively set according to the zoom magnification of the imaging units 11L and 11R.

That is, for example, the ratio of the size of the image display area 61L in which the image L which is captured in the imaging unit 11L is displayed, and the size of the image display area 61R in which the image R captured in the imaging unit 11R is displayed is set so as to correspond to the ratio of the zoom magnification of the imaging unit 11L and the zoom magnification of the imaging unit 11R.

In this case, since the zoom magnification of the imaging unit 11L is 2×, and the zoom magnification of the imaging unit 11R is 1×, the image display area 61L is set to the larger size than the image display area 61R, and the image display area 61R is set to the smaller size than the image display area 61L.

In addition, an image L with high zoom magnification of 2× is displayed as the through image in the large image display area 61L, and an image R with low zoom magnification of 1× is displayed as the through image in the small image display area 61R.

Here, such a state of the zoom magnification and the imaging direction of the imaging units 11L and 11R is also referred to as a state E, as shown in FIG. 5.

In addition, as described above, when the imaging directions of the imaging units 11L and 11R are the same, the zoom magnification of the imaging unit 11L is 2×, and the zoom magnification of the imaging unit 11R is 1×, similarly to the case in the display state B, the user is able to capture a scenery which is in the imaging directions of the imaging units 11L and 11R in a wide angle using the imaging unit 11R of which the zoom magnification is 1×, and to capture the image using the imaging unit 11L of which the zoom magnification is 2× by performing the telephoto imaging.

When the zoom magnification of the imaging unit 11L is 2×, and the imaging direction thereof is the front direction, and the zoom magnification of the imaging unit 11R is 2×, and the imaging direction thereof is the front direction, since the zoom magnification of the imaging unit 11L and zoom magnification of the imaging unit 11R match each other, and the imaging directions match each other, as well, one screen display for displaying the through image is performed in the one image display area 61.

Here, such a state of the zoom magnification and the imaging direction of the imaging units 11L and 11R is also referred to as a state F, as shown in FIG. 5.

When the zoom magnification of the imaging unit 11L is 2×, and the imaging direction thereof is the front direction, and the zoom magnification of the imaging unit 11R is 1×, and the imaging direction thereof is the right direction, the two screens display for displaying the through image is performed in the two image display areas 61L and 61R, since the zoom magnification of the imaging unit 11L and the zoom magnification of the imaging unit 11R do not match each other, and the imaging directions do not match each other, as well.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the zoom magnification of the imaging unit 11L is 2×, and the zoom magnification of the imaging unit 11R is 1×, the image display area 61L is set to the larger size size than the image display area 61R, and the image display area 61R is set to the smaller size size than the image display area 61L.

In addition, an image L with high zoom magnification of 2× is displayed as the through image in the large image display area 61L, and an image R with low zoom magnification of 1× is displayed as the through image in the small image display area 61R.

Here, such a state of the zoom magnification and the imaging direction of the imaging units 11L and 11R is also referred to as a state G, as shown in FIG. 5.

When the zoom magnification of the imaging unit 11L is 2×, and the imaging direction thereof is the front direction, and the zoom magnification of the imaging unit 11R is 2×, and the imaging direction thereof is the right direction, the two screens display for displaying the through image is performed in the two image display areas 61L and 61R, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, the image display areas 61L and 61R are set to the same size, since both the imaging units 11L and 11R have the same zoom magnification of 2×.

In addition, images L and R which have the same zoom magnification of 2× are respectively displayed as the through image in the image display areas 61L and 61R of the same size.

Here, such a state of the zoom magnification and the imaging direction of the imaging units 11L and 11R is also referred to as a state H, as shown in FIG. 5.

When the zoom magnification of the imaging unit 11L is 1×, and the imaging direction thereof is the left direction, and the zoom magnification of the imaging unit 11R is 1×, and the imaging direction thereof is the front direction, the two screens display for displaying the through image is performed in the two image display areas 61L and 61R, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, the image display areas 61L and 61R are set to the same size, since both the imaging units 11L and 11R have the same zoom magnification of 1×.

In addition, images L and R which have the same zoom magnification of 1× are respectively displayed as the through image in the image display areas 61L and 61R of the same size.

Here, such a state of the zoom magnification and the imaging direction of the imaging units 11L and 11R is also referred to as a state I, as shown in FIG. 5.

When the zoom magnification of the imaging unit 11L is 1×, and the imaging direction thereof is the left direction, and the zoom magnification of the imaging unit 11R is 2×, and the imaging direction thereof is the front direction, the two screens display for displaying the through image is performed in the two image display areas 61L and 61R, since the zoom magnification of the imaging unit 11L and the zoom magnification of the imaging unit 11R do not match each other, and the imaging directions of the imaging units 11L and 11R do not match each other, as well.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the zoom magnification of the imaging unit 11L is 1×, and the zoom magnification of the imaging unit 11R is 2×, the image display area 61L is set to the smaller size than the image display area 61R, and the image display area 61R is set to the larger size than the image display area 61L.

In addition, an image L with low zoom magnification of 1× is displayed as the through image in the small image display area 61L, and an image R with high zoom magnification of 2× is displayed as the through image in the large image display area 61R.

Here, such a state of the zoom magnification and the imaging direction of the imaging units 11L and 11R is also referred to as a state J, as shown in FIG. 5.

When the zoom magnification of the imaging unit 11L is 1×, and the imaging direction thereof is the left direction, and the zoom magnification of the imaging unit 11R is 1×, and the imaging direction thereof is the right direction, the two screens display for displaying the through image is performed in the two image display areas 61L and 61R, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since both the imaging units 11L and 11R have the same zoom magnification of 1×, the image display areas 61L and 61R are set to the same size.

In addition, the images L and R which have the same zoom magnification of 1× are respectively displayed as the through image in the image display areas 61L and 61R of the same size.

Here, such a state of the zoom magnification and the imaging direction of the imaging units 11L and 11R is also referred to as a state K, as shown in FIG. 5.

When the zoom magnification of the imaging unit 11L is 1×, and the imaging direction thereof is the left direction, and the zoom magnification of the imaging unit 11R is 2×, and the imaging direction thereof is the right direction, the two screens display for displaying the through image is performed in the two image display areas 61L and 61R, since the zoom magnification of the imaging unit 11L and the zoom magnification of the imaging unit 11R do not match each other, and the imaging directions do not match each other, as well.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the imaging units 11L has the same zoom magnification of 1×, and imaging unit 11R has the zoom magnification of 2×, the image display area 61L is set to the smaller size than the image display area 61R, and the image display area 61R is set to the larger size than the image display area 61L.

In addition, an image L with low zoom magnification of 1× is displayed as the through image in the small image display area 61L, and an image R with high zoom magnification of 2× is displayed as the through image in the large image display area 61R.

Here, such a state of the zoom magnification and the imaging direction of the imaging units 11L and 11R is also referred to as a state L, as shown in FIG. 5.

When the zoom magnification of the imaging unit 11L is 2×, and the imaging direction thereof is the left direction, and the zoom magnification of the imaging unit 11R is 1×, and the imaging direction thereof is the front direction, the two screens display for displaying the through image is performed in the two image display areas 61L and 61R, since the zoom magnification of the imaging unit 11L and the zoom magnification of the imaging unit 11R do not match each other, and the imaging directions do not match each other, as well.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the zoom magnification of the imaging unit 11L is 2×, and the zoom magnification of the imaging unit 11R is 1×, the image display area 61L is set to the larger size than the image display area 61R, and the image display area 61R is set to the smaller size than the image display area 61L.

In addition, an image L with high zoom magnification of 2× is displayed as the through image in the large image display area 61L, and an image R with the low zoom magnification of 1× is displayed as the through image in the small image display area 61R.

Here, such a state of the zoom magnification and the imaging direction of the imaging units 11L and 11R is also referred to as a state M, as shown in FIG. 5.

When the zoom magnification of the imaging unit 11L is 2×, and the imaging direction thereof is the left direction, and the zoom magnification of the imaging unit 11R is 2×, and the imaging direction thereof is the front direction, the two screens display for displaying the through image is performed in the two image display areas 61L and 61R, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since both the zoom magnifications of the imaging units 11L and 11R are 2×, the image display areas 61L and 61R are set to the same size.

In addition, images L and R which have the same zoom magnification of 2× are respectively displayed as the through image in the image display areas 61L and 61R of the same size.

Here, such a state of the zoom magnification and the imaging direction of the imaging units 11L and 11R is also referred to as a state N as shown in FIG. 5.

When the zoom magnification of the imaging unit 11L is 2×, and the imaging direction thereof is the left direction, and the zoom magnification of the imaging unit 11R is 1×, and the imaging direction thereof is the right direction, the two screens display for displaying the through image is performed in the two image display areas 61L and 61R, since the zoom magnification of the imaging unit 11L and the zoom magnification of the imaging unit 11R do not match each other, and the imaging directions do not match each other, as well.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since the zoom magnification of the imaging unit 11L is 2×, and the zoom magnification of the imaging unit 11R is 1×, the image display area 61L is set to the larger size than the image display area 61R, and the image display area 61R is set to the smaller size than the image display area 61L.

In addition, an image L with high zoom magnification of 2× is displayed as the through image in the large image display area 61L, and an image R with the low zoom magnification of 1× is displayed as the through image in the small image display area 61R.

Here, such a state of the zoom magnification and the imaging direction of the imaging units 11L and 11R is also referred to as a state O, as shown in FIG. 5.

When the zoom magnification of the imaging unit 11L is 2×, and the imaging direction thereof is the left direction, and the zoom magnification of the imaging unit 11R is 2×, and the imaging direction thereof is the right direction, the two screens display for displaying the through image is performed in the two image display areas 61L and 61R, since the imaging directions of the imaging units 11L and 11R do not match each other.

In the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

In this case, since both the zoom magnifications of the imaging units 11L and 11R are 2×, the image display areas 61L and 61R are set to the same size.

In addition, images L and R which have the same zoom magnification of 2× are respectively displayed as the through image in the image display areas 61L and 61R of the same size.

Here, such a state of the zoom magnification and the imaging direction of the imaging units 11L and 11R is also referred to as a state P as shown in FIG. 5.

In addition, in FIG. 5, in order to simplify the description, the zoom magnification to be obtained in the imaging units 11L and 11R is set to two of 1× magnification and 2× magnification, however, the other values may be adopted as the respective zoom magnification of the imaging units 11L and 11R.

In addition, in the two screens display, as described above, the ratio of the size of the image display area 61L on which the image L captured in the imaging unit 11L is displayed, and the size of the image display area 61R on which the image R captured in the imaging unit 11R is displayed is set to correspond to the ratio of the zoom magnification of the imaging unit 11L and the zoom magnification of the imaging unit 11R.

For example, when the zoom magnification of the imaging unit 11L is 1×, and the zoom magnification of the imaging unit 11R is 2×, since the ratio of the zoom magnification of the imaging unit 11L to the zoom magnification of the imaging unit 11R is 1:2, the ratio of the size of the image display area 61L to the size of the image display area 61R is set to be 1:2 which is the ratio of the zoom magnification of the imaging unit 11L to the zoom magnification of the imaging unit 11R.

In addition, for example, when the zoom magnification of the imaging unit 11L is 2.3×, and the zoom magnification of the imaging unit 11R is 3×, since the ratio of the zoom magnification of the imaging unit 11L to the zoom magnification of the imaging unit 11R is 2.3:3, the ratio of the size of the image display areas 61L and 61R is set to 2.3:3 which is the ratio of the zoom magnification of the imaging unit 11L to the zoom magnification of the imaging unit 11R.

In addition, regarding the sizes of the image display areas 61L and 61R, the maximum value and the minimum value thereof are determined in advance. The sizes of the image display areas 61L and 61R are set (limited) so as not to exceed the maximum value, and not to be less than the minimum value.

Camera Control Processing

FIGS. 6 to 9 are flowcharts which describe control processing (camera control processing) of the imaging units 11L and 11R which is performed by the control unit 18 in FIG. 1.

Figure 6:
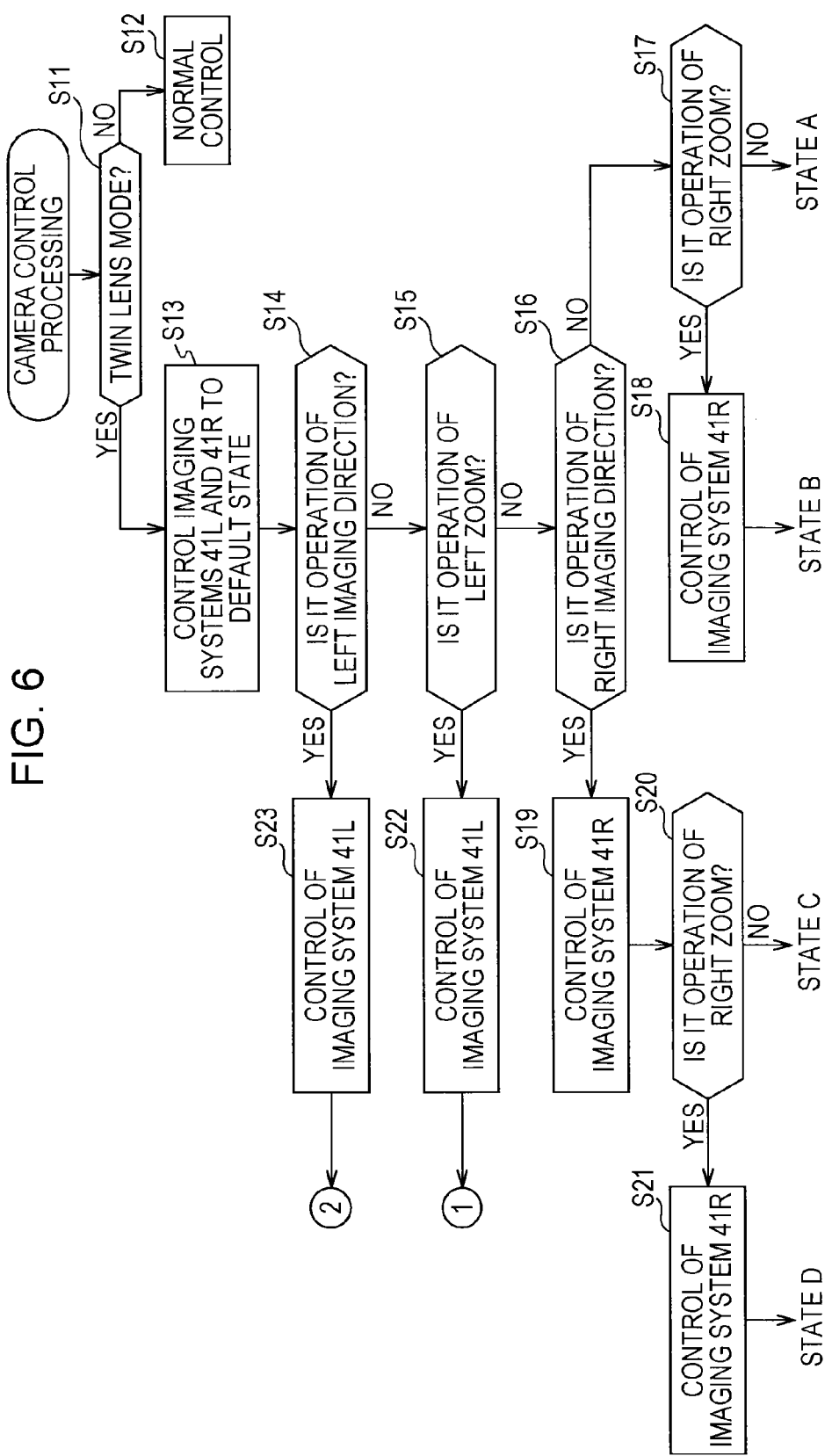
FIG. 6 is a flowchart which describes camera control processing.
Figure 7:
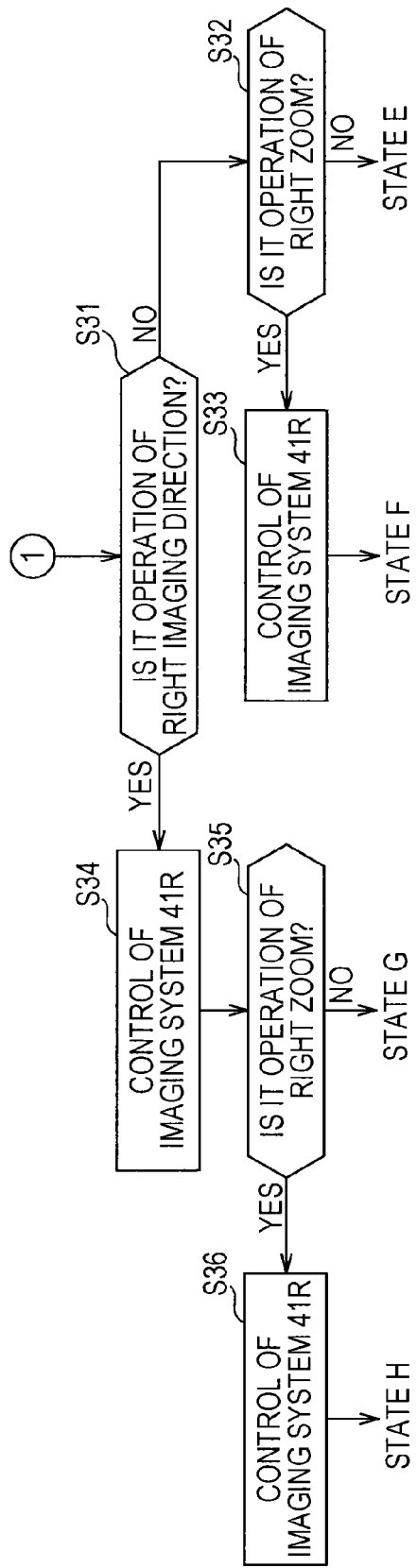
FIG. 7 is a flowchart which describes the camera control processing.
Figure 8:
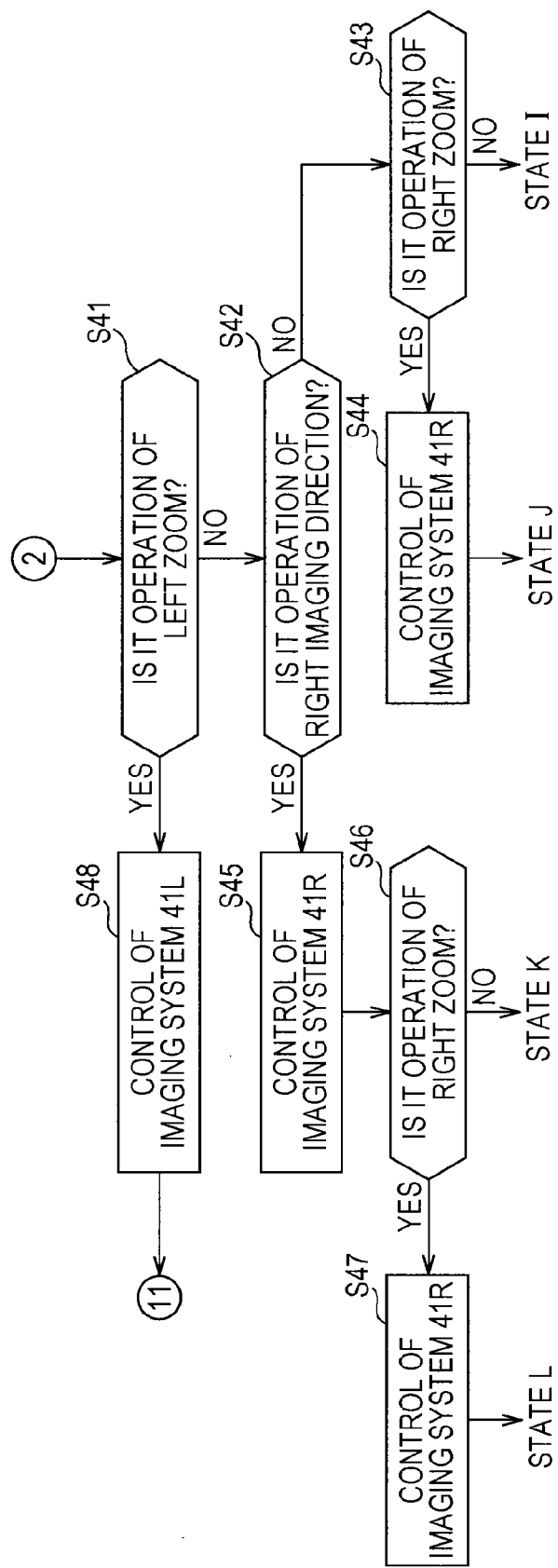
FIG. 8 is a flowchart which describes the camera control processing.
Figure 9:
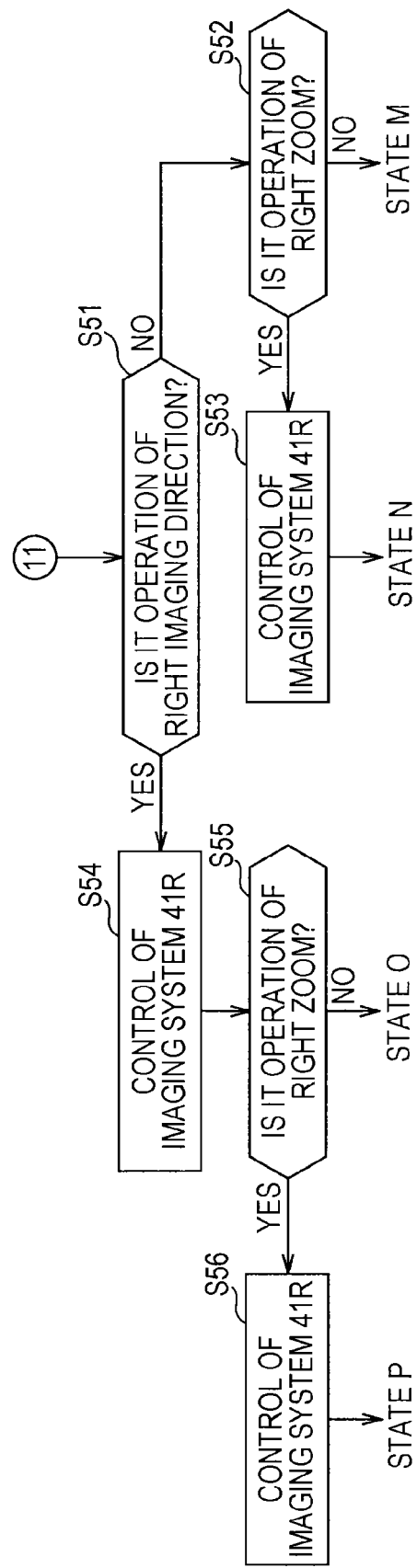
FIG. 9 is a flowchart which describes the camera control processing.

Here, FIGS. 7 and 8 are subsequent figures of FIG. 6, and FIG. 9 is the subsequent figure of FIG. 8.

In step S11, the control unit 18 determines whether or not the operation mode is the twin lens mode between the twin lens mode and the single lens mode.

In step S11, when it is determined that the operation mode is not the twin lens mode, that is, when the operation mode is the single lens mode, and for example, only one of the imaging units 11L and 11R is operated, the processing proceeds to step S12, and the control unit 18 performs a normal control on one imaging unit which is operating between the imaging units 11L and 11R similarly to the control on a digital camera (single lens digital camera) with one imaging unit.

In addition, in step S11, when it is determined that the operation mode is the twin lens mode, the processing proceeds to step S13, and for example, if the operation mode has just changed to the twin lens mode from the single lens mode due to the operation of the input/output panel 14, or the operation unit 17, then the control unit 18 controls the imaging system 41L of the imaging unit 11L (FIG. 2) and the imaging system 41R of the imaging unit 11R to be in a default state, and the processing proceeds to step S14.

Here, the default state of the imaging systems 41L and 41R means a state, for example, where the zoom magnification is 1×, and the imaging direction is the front direction.

In step S14, the control unit 18 determines whether or not a horizontal operation (hereinafter, referred to as the left imaging direction operation) of the operation icon 62L (FIG. 4) of the input/output panel 14 is performed, so as to adjust the imaging direction of the imaging system 41L (FIG. 2) which captures the image L.

In step S14, when it is determined that the left imaging direction operation is not performed, the processing proceeds to step S15, and the control unit 18 determines whether or not a vertical operation (hereinafter, referred to as the left zoom operation) of the operation icon 62L of the input/output panel 14 is performed, so as to adjust the zoom magnification of the imaging system 41L which captures the image L.

In step S15, when it is determined that the left zoom operation is not performed, the processing proceeds to step S16, the control unit 18 determines whether or not a horizontal operation (hereinafter, referred to as the right imaging direction operation) of the operation icon 62R (FIG. 4) of the input/output panel 14 is performed, so as to adjust the imaging direction of the imaging system 41R (FIG. 2) which captures the image R.

In step S16, when it is determined that the right imaging direction operation is not performed, the processing proceeds to step S17, and the control unit 18 determines whether or not a vertical operation (hereinafter, referred to as the right zoom operation) of the operation icon 62R of the input/output panel 14 is performed, so as to adjust the zoom magnification of the imaging system 41R which captures the image R.

In step S17, when it is determined that the right zoom operation is not performed, the control unit 18 does not particularly control the imaging systems 41L and 41R.

In this case, in step S13, if the imaging systems 41L and 41R are in the default state, then the state of the imaging systems 41L and 41R becomes, for example, the state A described in FIG. 5.

In addition, in step S17, when it is determined that the right zoom operation is not performed, the processing proceeds to step S18, and the control unit 18 controls the imaging system 41R, for example, so that the zoom magnification becomes 2×, according to the right zoom operation.

In this case, in step S13, if the imaging systems 41L and 41R are in the default state, then the state of the imaging systems 41L and 41R becomes, for example, the state B described in FIG. 5.

In addition, in step S16, when it is determined that the right zoom operation is performed, the processing proceeds to step S19, and the control unit 18 controls the imaging system 41R, for example, so that the imaging direction of the imaging system 41R becomes the right direction, according to the right imaging operation, and the processing proceeds to step S20.

In step S20, the control unit 18 determines whether or not the right zoom operation (vertical operation of the operation icon 62R which adjusts the zoom magnification of the imaging system 41R) is performed.

In step S20, when it is determined that the right zoom operation is not performed, the control unit 18 does not particularly control the imaging systems 41L and 41R.

In this case, in step S13, if the imaging systems 41L and 41R are in the default state, then the state of the imaging systems 41L and 41R becomes, for example, the state C described in FIG. 5.

In addition, in step S20, when it is determined that the right zoom operation is performed, the processing proceeds to step S21, and the control unit 18 controls the imaging system 41R, for example, so that the zoom magnification becomes 2×, according to the right zoom operation.

In this case, in step S13, if the imaging systems 41L and 41R are in the default state, then the state of the imaging systems 41L and 41R becomes, for example, the state D described in FIG. 5.

On the other hand, in step S15, when it is determined that the left zoom operation is performed, the processing proceeds to step S22, and the control unit 18 controls the imaging systems 41L, for example, so that the zoom magnification becomes 2×, according to the left zoom operation, and the processing proceeds to step S31 in FIG. 7.

In step S31 in FIG. 7, the control unit 18 determines whether or not the right imaging direction operation (horizontally operating the operation icon 62R of the input/output panel 14 so as to adjust the imaging direction of the imaging system 41R) is performed.

In step S31, when it is determined that the right imaging direction operation is not performed, the processing proceeds to step S32, the control unit 18 determines whether or not the right zoom operation (vertically operating the operation icon 62R of the input/output panel 14 so as to adjust the zoom magnification of the imaging system 41R) is performed.

In step S32, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state E described in FIG. 5.

In addition, in step S32, when it is determined that the right zoom operation is performed, the processing proceeds to step S33, and the control unit 18 control the imaging system 41R, for example, so that the zoom magnification becomes 2×, according to the right zoom operation.

In this case, in step S13, if the imaging systems 41L and 41R are in the default state, then the state of the imaging systems 41L and 41R becomes, for example, the state F described in FIG. 5.

In addition, in step S31, when it is determined that the right imaging direction operation is performed, the processing proceeds to step S34, and the control unit 18 controls the imaging system 41R, for example, so that the imaging direction of the imaging system 41R becomes the right direction according to the right imaging direction operation, and the processing proceeds to step S35.

In step S35, the control unit 18 determines whether or not the right zoom operation is performed.

In step S35, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state G described in FIG. 5.

In addition, in step S35, when it is determined that the right zoom operation is performed, the processing proceeds to step S36, and the control unit 18 controls the imaging system 41R, for example, so that the zoom magnification becomes 2×, according to the right zoom operation.

In this case, in step S13 in FIG. 6, if the imaging systems 41L and 41R are in the default state, then the state of the imaging systems 41L and 41R becomes, for example, the state H described in FIG. 5.

Returning to FIG. 6, in step S14, when it is determined that the left imaging direction operation is performed, the processing proceeds to step S23, and the control unit 18 controls the imaging system 41L, for example, so that the imaging direction of the imaging system 41L becomes the left direction according to the left imaging direction operation, and the processing proceeds to step S41 in FIG. 8.

In step S41 in FIG. 8, the control unit 18 determines whether or not the left zoom operation is performed.

In step S41, when it is determined that the left zoom operation is not performed, the processing proceeds to step S42, and the control unit 18 determines whether or not the right imaging direction operation is performed.

In step S42, when it is determined that the right imaging direction operation is not performed, the processing proceeds to step S43, and the control unit 18 determines whether or not the right zoom operation is performed.

In step S43, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state I described in FIG. 5.

In addition, in step S43, when it is determined that the right zoom operation is performed, the processing proceeds to step S44, and the control unit 18 controls the imaging system 41R, for example, so that the zoom magnification becomes 2×, according to the right zoom operation.

In this case, in step S13 in FIG. 6, if the imaging systems 41L and 41R are in the default state, then the state of the imaging systems 41L and 41R becomes, for example, the state J described in FIG. 5.

In addition, in step S42, when it is determined that the right imaging direction operation is performed, the processing proceeds to step S45, and the control unit 18 controls the imaging system 41R, for example, so that the imaging direction of the imaging system 41R becomes the right direction according to the right imaging direction operation, and the processing proceeds to step S46.

In step S46, the control unit 18 determines whether or not the right zoom operation is performed.

In step S46, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state K described in FIG. 5.

In addition, in step S46, when it is determined that the right zoom operation is performed, the processing proceeds to step S47, and the control unit 18 controls the imaging system 41R, for example, so that the zoom magnification becomes 2×, according to the right zoom operation.

In this case, in step S13 in FIG. 6, if the imaging systems 41L and 41R are in the default state, then the state of the imaging systems 41L and 41R becomes, for example, the state L described in FIG. 5.

On the other hand, in step S41, when it is determined that the left zoom operation is performed, the processing proceeds to step S48, and the control unit 18 controls the imaging system 41L, for example, so that the zoom magnification becomes 2×, according to the left zoom operation, and the processing proceeds to step S51 in FIG. 9.

In step S51 in FIG. 9, the control unit 18 determines whether or not the right imaging direction operation is performed.

In step S51, when it is determined that the right imaging direction operation is not performed, the processing proceeds to step S52, and the control unit 18 determines whether or not the right zoom operation is performed.

In step S52, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state M described in FIG. 5.

In addition, in step S52, when it is determined that the right zoom operation is performed, the processing proceeds to step S53, and the control unit 18 controls the imaging system 41R, for example, so that the zoom magnification becomes 2×, according to the right zoom operation.

In this case, in step S13 in FIG. 6, if the imaging systems 41L and 41R are in the default state, then the state of the imaging systems 41L and 41R becomes, for example, the state N described in FIG. 5.

In addition, in step S51, when it is determined that the right imaging direction operation is performed, the processing proceeds to S54, and the control unit 18 controls the imaging system 41R, for example, so that the imaging direction of the imaging system 41R becomes the right direction, according to the right imaging direction operation, and the processing proceeds to step S55.

In step S55, the control unit 18 determines whether or not the right zoom operation is performed.

In step S55, when it is determined that the right zoom operation is not performed, the control unit 18 does not particularly control the imaging systems 41L and 41R.

In this case, in step S13 in FIG. 6, if the imaging systems 41L and 41R are in the default state, then the state of the imaging systems 41L and 41R becomes, for example, the state O described in FIG. 5.

In addition, in step S55, when it is determined that the right zoom operation is performed, the processing proceeds to step S56, and the control unit 18 controls the imaging system 41R, for example, so that the zoom magnification becomes 2×, according to the right zoom operation.

In this case, in step S13 in FIG. 6, if the imaging systems 41L and 41R are in the default state, then the state of the imaging systems 41L and 41R becomes, for example, the state P described in FIG. 5.

As described above, in the digital camera in FIG. 1, the control unit 18 independently controls the respective imaging units 11L and 11R according to the vertical and horizontal operations with respect to the input/output panel 14, accordingly, it is possible to improve the operability of the digital camera.

That is, the user is able to seamlessly switch, for example, the zoom magnification of the imaging units 11L and 11R, and the state of the imaging direction to the state A to state P in FIG. 5, by operating the operation area icons 62L and 62R (FIG. 4).

In addition, for example, since the imaging directions of the imaging units 11L and 11R can be changed due to the horizontal operation with respect to the operation area icons 62L and 62R, and zoom magnification of the imaging units 11L and 11R can be changed due to the vertical operation with respect to the operation area icons 62L and 62R, the user is able to change the imaging direction and the zoom magnification of the imaging units 11L and 11R easily, without complicated operations, and by so-called intuitive operations.

Another Display Example of Input/Output Panel 14

Figure 10:
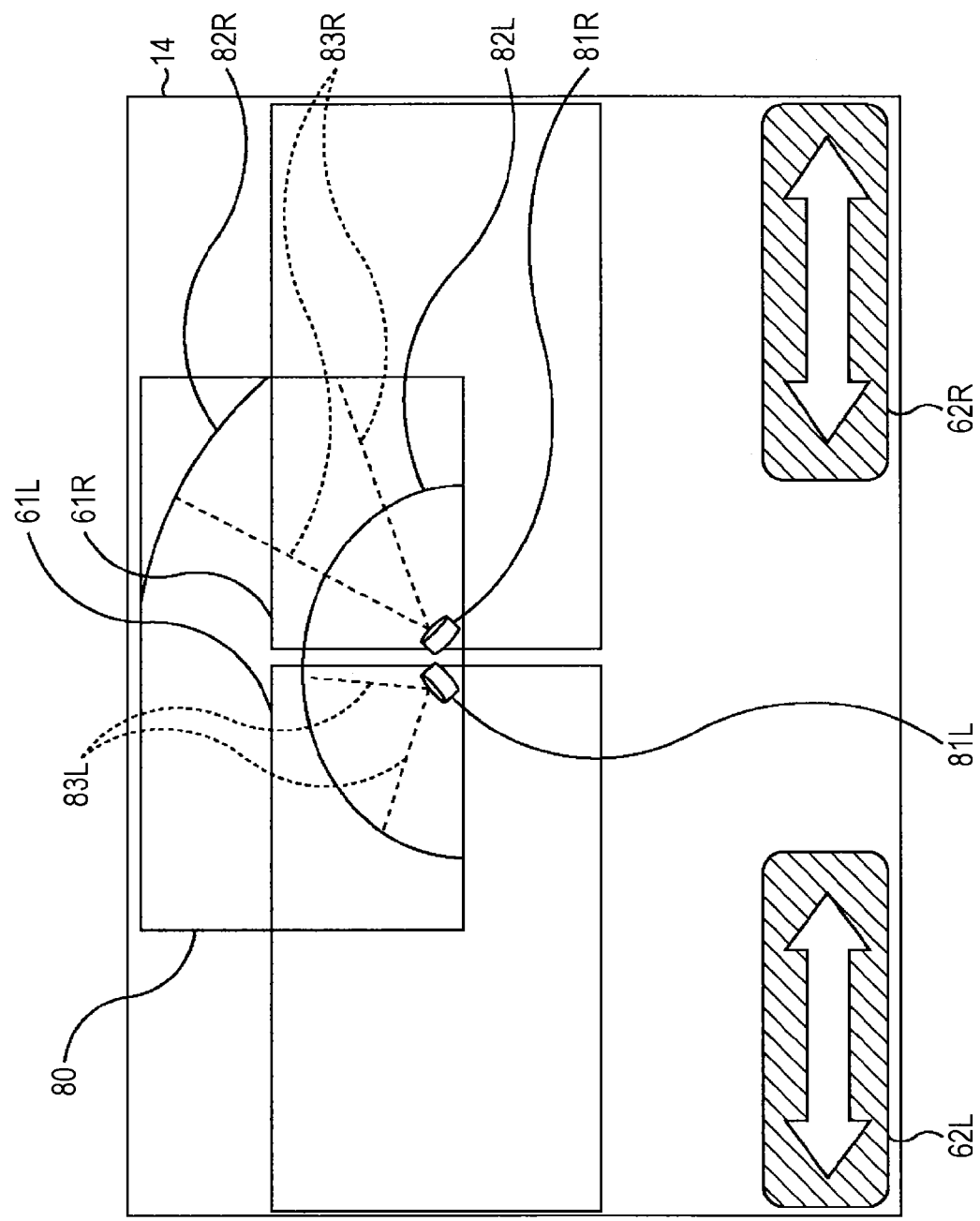
FIG. 10 is a diagram which shows a display example of the input/output panel.

FIG. 10 is a diagram which shows another display example of the input/output panel 14 in FIG. 1.

In the display of the input/output panel 14 in FIG. 10, a view angle UI (User Interface) 80 is overlapped with the display in FIG. 4.

The view angle UI 80 is a rectangular image (graphics) which displays an imaging range which is captured in each imaging units 11L and 11R, and includes an L icon 81L and R icon 81R, focal distance lines 82L and 82R, and view angle lines 83L and 83R (as a part of a GUI).

The L icon 81L is an icon in imitation of the imaging unit 11L, and is displayed in a state of facing the direction corresponding to the imaging direction of the imaging unit 11L.

The R icon 81R is an icon in imitation of the imaging unit 11R, and is displayed in a state of facing the direction corresponding to the imaging direction of the imaging unit 11R.

The focal distance line 82L is an arcuate line of a circle of which a predetermined position adjacent to both directions of the L icon 81L and the R icon 81R is set as the center, and the distance from the L icon 81L to the arcuate line as the focal distance line 82L, that is, a radius of the circle (hereinafter, referred to as a focal distance circle of the imaging unit 11L) on which the focal distance line 82L becomes a part of the circle, and having a predetermined position as the center corresponds to the focal distance (consequently, the zoom magnification) of the imaging unit 11L.

Similarly to the focal distance line 82L, the focal distance line 82R is an arcuate line of a circle of which a predetermined position is set as the center, and the distance from the R icon 81R to the arcuate line as the focal distance line 82R, that is, a radius of the circle (hereinafter, referred to as a focal distance circle of the imaging unit 11R) on which the focal distance line 82R becomes a part of the circle, and having a predetermined position as the center corresponds to the focal distance (consequently, the zoom magnification) of the imaging unit 11R.

The view angle lines 83L are two line segments of the focal distance circle of the imaging unit 11L in the radius direction, and the angle of the two line segments corresponds to an angle of view of the imaging unit 11L (the image captured in the imaging unit 11L). In addition, the direction bisects the angle of the two line segments as the view angle line 83L corresponds to the imaging direction of the imaging unit 11L.

The view angle lines 83R are two line segments of the focal distance circle of the imaging unit 11R in the radius direction, and the angle of the two line segments corresponds to an angle of view of the imaging unit 11R. In addition, the direction bisects the angle of the two line segments as the view angle line 83R corresponds to the imaging direction of the imaging unit 11R.

In the above described view angle UI 80, when the zoom magnification of the imaging units 11L and 11R is changed, the focal distance lines 82L and 82R, and the view angle lines 83L and 83R are changed according to the changed zoom magnification (and the angle of view).

In addition, when the imaging direction of the imaging units 11L and 11R is changed, the L icon 81L and the R icon 81R, and the view angle lines 83L and 83R are changed according to the changed imaging direction.

The user is able to identify the imaging range which is captured in the imaging units 11L and 11R, respectively, by referring to the view angle UI 80.

In addition, by referring to the view angle UI 80, the user is able to adjust the imaging direction of the imaging units 11L and 11R easily so that the line segment in the vicinity of the view angle line 83R between the two line segments in the radius direction as the view angle line 83L (approximately) overlaps with the line segment in the vicinity of the view angle line 83L between the two line segments in the radius direction as the view angle line 83R, and due to this, it is possible to easily obtain images which are respectively captured in the imaging units 11L and 11R, that is, a so-called panoramic images with wide angle which are pieced together.

In addition, the view angle UI 80 can be set as a non-display. The display and non-display of the view angle UI 80 (on and off of the display) can be switched by operating the input/output panel 14 and the operation unit 17.

In addition, in the digital camera in FIG. 1, it is possible to generate a panoramic image by piecing together the images which are respectively captured in the imaging units 11L and 11R. It is possible to switch whether to generate the panoramic image, or to stick to the images which are respectively captured in the imaging units 11L and 11R, without generating such a panoramic image by operating the input/output panel 14 and the operation unit 17.

When the input/output panel 14 and the operation unit 17 are operated so as to generate the panoramic image, the control unit 18 performs signal processing which generates the panoramic image by piecing together the images which are respectively captured in the imaging units 11L and 11R, by controlling the signal processing unit 12.

Here, in this specification, the processing which is performed by a computer (CPU) according to a program is not necessarily performed in time series in the order which is described in the flowchart. That is, the processing which is performed by a computer (CPU) according to a program includes parallel processing, or individual processing (for example, processing performed in parallel, or object processing), as well.

In addition, the program may be a program which is processed by a single computer (processor), or a program which is processed by a plurality of computers by being distributed.

In addition, embodiments according to the present technology are not limited to the above described embodiments, and may be variously changed without departing from the scope of the present technology.

That is, according to the embodiment, two imaging units 11L and 11R are provided in the digital camera, however, the digital camera may be provided with one imaging unit, or three or more imaging units.

In addition, the present technology may be applied to imaging of any of still images and moving images.

In addition, according to the embodiments, the control unit 18 is assumed to independently control the two imaging unit 11L and 11R, respectively, however, in the control unit 18, it is possible to cause the imaging units 11L and 11R to perform the same processing, by controlling one side of the imaging units 11L and 11R to be follow the control of the other side. In the control unit 18, it is possible to switch the determination of whether controlling the imaging units 11L and 11R independently, or controlling one side of the imaging units 11L and 11R to follow the control of the other side, for example, by the user' operation.

In addition, the technology is also configured as follows.

(1) An apparatus including:
an operation signal reception unit which receives an operation signal which corresponds to a vertical operation in a vertical direction of a screen with respect to a panel which is able to detect a touch or an approach with respect to a plurality of positions on the screen; and
a control unit configured to independently control processing related to each of a plurality of imaging units according to the vertical operation.

(2) The apparatus according to (1), wherein the control unit changes a zoom magnification level of each of the plurality of imaging units according to the vertical operation.

(3) The apparatus according to (1) or (2), wherein the control unit changes an imaging direction of each of the plurality of imaging units when the operation signal reception unit receives a horizontal operation.

(4) The apparatus according to (1) to (3), further comprising;
the plurality of imaging units each configured to generate an image; and
a plurality of imaging controllers each configured to control a corresponding one of the plurality of imaging units.

(5) The apparatus according to (4), further comprising:
a display configured to display the plurality of imaging controllers, and
the control unit independently zooms each of the plurality of imaging units based on an amount of pressure applied to the corresponding imaging controller.

(6) The apparatus according to (4) or (5), wherein the control unit independently zooms each of the plurality of imaging units based on a distance of an object from the corresponding imaging controller.

(7) The apparatus according to (4) to (6), wherein the display displays the plurality of imaging controllers in an operation area.

(8) The apparatus according to (4) to (7), wherein the display displays an imaging range for each image of the plurality of imaging units.

(9) The apparatus according to (4) to (8), wherein each of the plurality of imaging units includes a lens group and a diaphragm, and the image control unit is configured to independently control the lens group of each of the plurality of imaging units.

(10) The apparatus according to (9), wherein each of the plurality of imaging units includes a lens driving unit configured to change the focus of the lens group, and the image control unit is configured to independently control the lens driving unit of each of the plurality of imaging units.

(11) The apparatus according to (9) or (10), wherein each of lens driving units is configured to adjust a corresponding diaphragm of the corresponding imaging unit.

(12) The apparatus according to (9) to (11), wherein each of the lens groups includes a shake correction lens configured to move in a direction perpendicular to an optical axis, and the image control unit is configured to perform optical shake correction by controlling each shake correction lens.

(13) The apparatus according to (4) to (12), further comprising:
an image processing unit configured to independently perform image processing on the image from each of the plurality of imaging units.

(14) The apparatus according to (13), wherein the image processing unit independently performs shake correction processing on the image from each of the plurality of imaging units.

(15) The apparatus according to (1) to (14), further comprising:
a display configured to display the image from each of the plurality of imaging units such that a size of each image corresponds to a zoom magnification level of a corresponding one of the plurality of imaging units.

(16) A method including:
receiving an operation signal which corresponds to a vertical operation in a vertical direction of a screen with respect to a panel which is able to detect a touch or an approach with respect to a plurality of positions on the screen; and
independently controlling processing related to each of a plurality of imaging units according to the vertical operation.

(17) A non-transitory computer readable medium encoded with a program that, when loaded on a processor, causes the processor to perform a method including:
receiving an operation signal which corresponds to a vertical operation in a vertical direction of a screen with respect to a panel which is able to detect a touch or an approach with respect to a plurality of positions on the screen; and
independently controlling processing related to each of a plurality of imaging units according to the vertical operation.

(18) An apparatus including:
an operation signal reception unit which receives an operation signal which corresponds to a horizontal operation in a horizontal direction of a screen with respect to a panel which is able to detect a touch or an approach with respect to the screen; and
a control unit configured to independently control an imaging direction of each of a plurality of imaging units according to the horizontal operation.

(19) A method including:
receiving an operation signal which corresponds to a horizontal operation in a horizontal direction of a screen with respect to a panel which is able to detect a touch or an approach with respect to the screen; and
independently controlling an imaging direction of each of a plurality of imaging units according to the horizontal operation.

(20) A non-transitory computer readable medium encoded with a program that, when loaded on a processor, causes the processor to perform a method including:
receiving an operation signal which corresponds to a horizontal operation in a horizontal direction of a screen with respect to a panel which is able to detect a touch or an approach with respect to the screen; and independently controlling an imaging direction of each of a plurality of imaging units according to the horizontal operation.

Furthermore, the technology is also configured as follows.

(1) An imaging control device including, an operation signal reception unit which receives an operation signal which corresponds to a vertical operation in a direction vertical to a screen with respect to a panel which is able to detect a touch or an approach with respect to a plurality of positions on the screen; and a control unit which independently controls processing relating to each of a plurality of imaging units which captures images according to the vertical operation.

(2) The imaging control device which is described in (1), wherein the control unit independently controls each of the plurality of imaging units, according to a pressure of a touch with respect to the panel.

(3) The imaging control device which is described in (1), wherein the control unit independently controls each of the plurality of imaging units according to a distance of an object from the panel, which approaches the panel.

(4) The imaging control device which is described in (1), wherein the imaging unit includes an optical system, and the control unit independently controls each of the optical systems included in the plurality of imaging units.

(5) The imaging control device which is described in (4), wherein the optical system includes a lens and a diaphragm, and the control unit independently controls driving of the lens which is included in each of the optical systems of the plurality of imaging units.

(6) The imaging control device which is described in any one of (1) to (3), wherein the control unit independently controls zoom magnification of each of the plurality of imaging units by controlling the driving of the lens.

(7) The imaging control device which is described in (6), wherein the control unit displays each of images which are captured in the plurality of imaging units to a size corresponding to the zoom magnification of the imaging units which have captured the image.

(8) The imaging control device which is described in (4), wherein the control unit independently controls a focus of each of the plurality of imaging units by controlling the driving of the lens.

(9) The imaging control device which is described in (4), wherein the control unit independently controls a diaphragm which is included in each of the optical systems of the plurality of imaging unit.

(10) The imaging control device which is described in (4), wherein the optical system includes a function of camera shake correction which corrects camera shake by moving in a direction perpendicular to an optical axis, and the control unit independently controls on and off switching of the function of camera shake correction which is included in each of the optical systems of the plurality of imaging units.

(11) The imaging control device which is described in any one of (1) to (10), wherein the imaging unit includes, an optical system, an imaging element which performs photoelectric conversion to light which is from the optical system so as to convert to an image signal, and an imaging processing unit which performs image processing of the image signal obtained in the imaging element, and wherein the control unit independently controls image processing of each of the image processing units which are included in the plurality of imaging units.

(12) The imaging control device which is described in (11), wherein the image processing unit performs the camera shake correction processing which corrects the camera shake as the image processing, wherein the control unit independently controls the on and off switching of the camera shake correction processing of each of the image processing units which are included in the plurality of imaging units.

(13) The imaging control device which is described in any one of (1) to (12), wherein the control unit independently controls the imaging direction of each of the plurality of imaging units according to a parallel operation in a direction parallel to a screen with respect to the panel.

(14) The imaging control device which is described in (13), wherein the panel displays an operation area as a target of the parallel operation.

(15) The imaging control device which is described in (13) or (14), wherein the control unit displays imaging range which is captured in each of the plurality of imaging units.

(16) An imaging control method including, receiving an operation signal which corresponds to a vertical operation in a direction vertical to a screen with respect to a panel which is able to detect a touch or an approach with respect to a plurality of positions on a screen, and independently controlling processing relating to each of a plurality of imaging units which captures images according to the vertical operation.

(17) An imaging control device which includes, an operation signal reception unit which receives an operation signal which corresponds to a parallel operation in a direction parallel to a screen with respect to a panel which is able to detect a touch or an approach with respect to the screen, and a control unit which controls an imaging direction of an imaging unit for capturing an image according to the parallel operation.

(18) The imaging control device which is described in (17), wherein the panel is able to detect the touch or the approach with respect to a plurality of positions on the screen, and the control unit independently controls imaging direction of each of the plurality of imaging units according to the parallel operation.

(19) The imaging control device which is described in (18), wherein the control unit displays an imaging range which is captured in each of the plurality of imaging units.

(20) An imaging control method which includes, receiving an operation signal which corresponds to a parallel operation in a direction parallel to a screen with respect to a panel which is able to detect a touch or an approach with respect to the screen, and controlling imaging directions of imaging units which capture images according to the parallel operation.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus comprising:
    circuitry configured to
        receive an operation signal which corresponds to a vertical operation in a vertical direction of a screen with respect to a panel configured to detect a touch or an approach with respect to a plurality of positions on the screen, and
        independently control processing related to each of a plurality of imagers according to where the vertical operation is performed in relation to the screen, different areas of the screen corresponding to different ones of the plurality of imagers,
    wherein the circuitry is further configured to cause the screen to display a single image, formed from images from the plurality of imagers, when the plurality of imagers have a same zoom setting, and to cause the screen to display separate images when the plurality of imagers have different zoom settings.

2. The apparatus according to claim 1, wherein the circuitry changes a zoom magnification level of each of the plurality of imagers according to the vertical operation.

3. The apparatus according to claim 2, further comprising:
a display configured to display the image from each of the plurality of imagers such that a size of each image corresponds to a zoom magnification level of a corresponding one of the plurality of imagers.

4. The apparatus according to claim 1, wherein the circuitry changes an imaging direction of each of the plurality of imagers when the circuitry receives a horizontal operation.

5. The apparatus according to claim 1, further comprising;
the plurality of imagers each configured to generate an image,
wherein the circuitry is further configured to separately control the plurality of imagers.

6. The apparatus according to claim 5, further comprising:
a display configured to display images of the plurality of imagers, and
the circuitry independently zooms each of the plurality of images based on an amount of pressure applied to a corresponding area of the panel.

7. The apparatus according to claim 5, wherein the circuitry independently zooms each of the plurality of imagers based on a distance to an object.

8. The apparatus according to claim 5, wherein the display displays images of imaging controllers in an operation area.

9. The apparatus according to claim 5, wherein the display displays an imaging range for each image of the plurality of imagers.

10. The apparatus according to claim 5, wherein each of the plurality of imagers includes a lens group and a diaphragm, and the circuitry is configured to independently control the lens group of each of the plurality of imagers.

11. The apparatus according to claim 10, wherein each of the plurality of imagers includes a lens driver configured to change a focus of the lens group, and the circuitry is configured to independently control the lens driver of each of the plurality of imagers.

12. The apparatus according to claim 10, wherein each lens driver is configured to adjust a corresponding diaphragm of the corresponding imager.

13. The apparatus according to claim 10, wherein each of the lens groups includes a shake correction lens configured to move in a direction perpendicular to an optical axis, and the circuitry is configured to perform optical shake correction by controlling each shake correction lens.

14. The apparatus according to claim 5, wherein the circuitry is further configured to independently perform image processing on the image from each of the plurality of imagers.

15. The apparatus according to claim 14, wherein the circuitry independently performs shake correction processing on the image from each of the plurality of imagers.

16. A method comprising:
receiving, with circuitry, an operation signal which corresponds to a vertical operation in a vertical direction of a screen with respect to a panel configured to detect a touch or an approach with respect to a plurality of positions on the screen;
independently controlling, with the circuitry, processing related to each of a plurality of imagers according to where the vertical operation is performed in relation to the screen, different areas of the screen corresponding to different ones of the plurality of imagers;
causing, with the circuitry, the screen to display a single image, formed from images from the plurality of imagers, when the plurality of imagers have a same zoom setting; and
causing, with the circuitry, the screen to display separate images when the plurality of imagers have different zoom settings.

17. A non-transitory computer readable medium encoded with computer-readable instructions that, when executed by a processor, cause the processor to perform a method comprising:
receiving an operation signal which corresponds to a vertical operation in a vertical direction of a screen with respect to a panel configured to detect a touch or an approach with respect to a plurality of positions on the screen;
independently controlling processing related to each of a plurality of imagers according to where the vertical operation is performed in relation to the screen, different areas of the screen corresponding to different ones of the plurality of imagers;
causing the screen to display a single image, formed from images from the plurality of imagers, when the plurality of imagers have a same zoom setting; and
causing the screen to display separate images when the plurality of imagers have different zoom settings.

18. An apparatus comprising:
circuitry configured to
receive an operation signal which corresponds to a horizontal operation in a horizontal direction of a screen with respect to a panel configured to detect a touch or an approach with respect to the screen, and
independently control an imaging direction of each of a plurality of imagers according to where the horizontal operation is performed in relation to the screen, different areas of the screen corresponding to different ones of the plurality of imagers,
wherein the circuitry is further configured to cause the screen to display a single image, formed from images from the plurality of imagers, when the plurality of imagers have a same zoom setting, and to cause the screen to display separate images when the plurality of imagers have different zoom settings.

19. A method comprising:
receiving, with circuitry, an operation signal which corresponds to a horizontal operation in a horizontal direction of a screen with respect to a panel configured to detect a touch or an approach with respect to the screen;
independently controlling, with the circuitry, an imaging direction of each of a plurality of imagers according to where the horizontal operation is performed in relation to the screen, different areas of the screen corresponding to different ones of the plurality of imagers;
causing, with the circuitry, the screen to display a single image, formed from images from the plurality of imagers, when the plurality of imagers have a same zoom setting; and
causing, with the circuitry, the screen to display separate images when the plurality of imagers have different zoom settings.

20. A non-transitory computer readable medium encoded with computer-readable instructions that, when executed by a processor, cause the processor to perform a method comprising:
receiving an operation signal which corresponds to a horizontal operation in a horizontal direction of a screen with respect to a panel configured to detect a touch or an approach with respect to the screen;

independently controlling an imaging direction of each of a plurality of imagers according to where the horizontal operation is performed in relation to the screen, different areas of the screen corresponding to different ones of the plurality of imagers;

causing, with the circuitry, the screen to display a single image, formed from images from the plurality of imagers, when the plurality of imagers have a same zoom setting; and causing, with the circuitry, the screen to display separate images when the plurality of imagers have different zoom settings.

* * * * *